(12) United States Patent
Zou et al.

(10) Patent No.: US 9,408,064 B2
(45) Date of Patent: Aug. 2, 2016

(54) METHOD AND SYSTEM FOR OBTAINING USER EQUIPMENT ABILITY BY USER EQUIPMENT, HOME SUBSCRIBER DATA SERVER AND CORE NETWORK ELEMENT

(75) Inventors: Changle Zou, Shenzhen (CN); Zhendong Li, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 431 days.

(21) Appl. No.: 13/640,576

(22) PCT Filed: Aug. 3, 2011

(86) PCT No.: PCT/CN2011/077964
§ 371 (c)(1),
(2), (4) Date: Oct. 11, 2012

(87) PCT Pub. No.: WO2012/025007
PCT Pub. Date: Mar. 1, 2012

(65) Prior Publication Data
US 2013/0028196 A1  Jan. 31, 2013

(30) Foreign Application Priority Data
Aug. 23, 2010 (CN) .......................... 2010 1 0267136

(51) Int. Cl.
H04B 7/00 (2006.01)
H04W 8/20 (2009.01)
H04L 29/06 (2006.01)
H04L 29/08 (2006.01)

(52) U.S. Cl.
CPC .............. *H04W 8/20* (2013.01); *H04L 65/1016* (2013.01); *H04L 65/1073* (2013.01); *H04L 67/306* (2013.01); *H04L 69/24* (2013.01)

(58) Field of Classification Search
USPC .................................................. 370/310–350
See application file for complete search history.

(56) References Cited

U.S. PATENT DOCUMENTS

2005/0015499 A1* 1/2005 Mayer .......................... 709/228
2007/0183410 A1* 8/2007 Song ................. H04M 3/42008
370/352

(Continued)

FOREIGN PATENT DOCUMENTS

CN  101026882 A  8/2007
CN  101594647 A  12/2009

OTHER PUBLICATIONS

U.S. Appl. No. 61/259,709, Keller et al.*

(Continued)

*Primary Examiner* — Kwang B Yao
*Assistant Examiner* — Juvena Loo
(74) *Attorney, Agent, or Firm* — Ling Wu; Stephen Yang; Ling and Yang Intellectual Property

(57) ABSTRACT

The present invention discloses user equipment, a home subscriber data server (HSS) and a method and system for obtaining user equipment ability by a core network element. Wherein, the method for obtaining user equipment ability by the core network element includes: in and/or after the IP multimedia network subsystem (IMS) registration process, the home subscriber data server (HSS) informing the IMS network element of the ability information of user equipment (UE). The HSS is enabled to obtain the user equipment ability information in present invention, and can provide services for various operations of subscribers.

14 Claims, 4 Drawing Sheets

(56) References Cited

U.S. PATENT DOCUMENTS

| | | | | |
|---|---|---|---|---|
| 2007/0183411 | A1* | 8/2007 | Song | H04W 8/20 370/352 |
| 2009/0268635 | A1* | 10/2009 | Gallagher et al. | 370/254 |
| 2009/0323636 | A1* | 12/2009 | Dillon | H04L 29/12188 370/331 |
| 2011/0110331 | A1* | 5/2011 | Keller | H04M 7/1205 370/331 |
| 2011/0306321 | A1* | 12/2011 | Keller | H04W 48/18 455/411 |
| 2012/0106324 | A1* | 5/2012 | Keller | H04W 48/18 370/225 |
| 2012/0127926 | A1* | 5/2012 | Drevon | H04W 36/0022 370/328 |
| 2013/0016698 | A1* | 1/2013 | Keller | H04W 36/14 370/331 |

OTHER PUBLICATIONS

International Search Report for PCT/CN2011/077964 dated Oct. 20, 2011.

* cited by examiner

METHOD AND SYSTEM FOR OBTAINING USER EQUIPMENT ABILITY BY USER EQUIPMENT, HOME SUBSCRIBER DATA SERVER AND CORE NETWORK ELEMENT

TECHNICAL FIELD

The present invention relates to the communication filed, and in particular, to user equipment, a home subscriber data server (HSS) and a method and system for obtaining user equipment ability by a core network element.

BACKGROUND ART

The 2nd Generation (2G) and the 3rd Generation (3G) mobile communication networks, such as the Global System for Mobile communications (GSM) and Universal Mobile Telecommunications System (UMTS), provide voice services by way of Circuit Switching (CS), and form good coverage.

The development of radio access network towards packet switching enables the radio access network to bear voice and other services through a Packet Switching (PS) network, and directly access an IP Multimedia Network Subsystem (IMS), and the communication services including voice service are provided by the IMS. With the emergence of various high-speed broadband mobile access modes, the mobile communication standard organization proposed a next-generation network architecture called Long Term Evolution/System Architecture Evolution (LTE/SAE). LTE/SAE is a universal expressing method for evolved packet switched domain networks, wherein LTE represents the radio side, and SAE represents the core network side. This network architecture enables the evolved wireless communication system to provide a higher transmission rate, a shorter transmission delay, and have a lower cost, and meanwhile supports mobility between access systems within the 3rd Generation Partnership Project (3GPP), and mobility between a 3GPP access system and a non-3GPP access system, etc.

With the development of wireless broadband technology and the development of Internet Protocol (IP) technology, the whole network evolves towards the direction of all-IP, and the core network of the communication network evolves towards the IMS.

IMS is an IP-based network architecture proposed by 3GPP, it constructs an open and flexible service environment and is unrelated with access, and it can support multimedia applications and can provide plentiful multimedia services for users.

In the IMS service system, the control layer is separated from the service layer. The control layer does not provide specific services and only provides necessary triggering, routing, charging and other functions for the service layer. The service triggering and controlling functions in the control layer are implemented by the Call Session Control Function (CSCF). CSCF is divided into three types, namely, Proxy-CSCF (P-CSCF), Interrogating-CSCF (I-CSCF), and Serving-CSCF (S-CSCF), wherein the S-CSCF bears the main responsibility and the Interrogating type is optional. The service layer consists of a series of Application Servers (AS), and can provide specific services. The AS may be an independent entity, or may exist in the S-CSCF. The control layer S-CSCF controls service triggering according to the subscription information of the user, invokes the services on the AS, and implements the service functions. The AS and S-CSCF can be called as Server Equipment (SE) collectively. The end-to-end device in the session is called as User Equipment (UE) or terminal, and is responsible for interaction with the user. Some UEs have various modes for accessing the network, including accessing the network through the PS domain of 3GPP, accessing the network through other non-3GPP data domains, and can even access the network through the CS domain. Therefore, both the CS network and PS network (including LTE/SAE) can be used as access means for the IMS network. The user can set up an IMS session through the LTE/SAE or CS, the IMS is used to provide various service controls, and the LTE/SAE or CS is used to provide network access for the user. When the UE sets up various session requests through the IMS, the UE communicates with each entity in the IMS network using the standard Session Initiation Protocol (SIP).

When a UE implements a voice service in the access coverage area of the LTE/SAE, the UE directly accesses the IMS, and sets up an IMS session with a remote user. Due to limitations such as radio spectrum interference, the UE cannot access the LTE/SAE and the CS network of 2G/3G simultaneously, so when the user moves out from the above LTE/SAE coverage area, the network side switches the session of the user to the CS network in order to ensure the continuity of the voice service. Since the process of remote end update in this switching is relatively long, but the process of the UE locally switching the access network is relatively short, it is relatively hard to ensure synchronization if the two processes occur in parallel, and so the voice interruption of the user in this switching is very long. This switching is called as Single Radio Voice Call Continuity (SRVCC).

In the SRVCC scene, i.e., when a user with SRVCC subscription uses a terminal with SRVCC ability, the signaling portion of the session is anchored on an Access Transfer Control Function (ATCF) of the current residing network, and the media is anchored on an Access Gateway (AGW) controlled by the ATCF. Switching is controlled to occur using the ATCF/AGW as an anchor point, which can shorten the time of voice interruption caused by long process of remote end update and thus improve user experience.

FIG. 1 illustrates the architecture of a UE establishing an IMS voice session with a remote end through the LTE/SAE network, and all the network elements are described as follows:

101, a UE is responsible for interaction with the user, and can establish a session in place of the user through different access modes such as PS/CS;

102, a Mobility Management Entity (MME) is the storage place of the user subscription data in the current network, and is responsible for signaling management of the Non-Access Stratum (NAS) from the terminal to the network, tracking under the idle mode of the user and paging management function and bearer management;

103, a Serving Gateway (S-GW) is a gateway from the core network to the wireless system, and is responsible for user-plane bearer from the terminal to the core network, data buffer under the idle mode of the terminal, the function of initiating a service request from the network side, legal wiretap and packet data routing and forwarding function;

a Packet Data Network Gateway (PDN GW or P-GW) is a gateway of an Evolved Packet System (EPS) and the network outside the system, and is responsible for distribution of the IP address of the terminal, charging function, packet filter, and policy application and other functions.

For briefness, S-GW and PDN GW are described collectively.

104, a Home Subscriber Server (HSS) is the permanent storage place of the user subscription data, and is located in the home network to which the user subscribes;

105, an Access Transfer Control Function (ATCF) is responsible for anchoring the signaling portion of the UE session, and controls the Access Gateway (AGW) to anchor the media portion of the user session;

the ATCF is a logic functional entity, and its practical physical position may be in a certain network element, for example, P-CSCF/Interconnection Border Control Function (IBCF), and the like, on a signaling path when the UE performs IMS registration through the visited network LTE/SAE.

An Access Gateway (AGW) is responsible for anchoring the media portion of the UE session under control of the ATCF;

the AGW may be located in the Transition Gateway (TrGW) of the visited place, the PDN GW, the Media Gateway (MGW) of the CS domain or IMS domain, etc., that is, the AGW can be freely deployed depending on practical conditions and not all the cases are described here.

106, a Call Session Control Function (CSCF), it is divided into three types, namely, Proxy, Interrogating and Serving, wherein the Serving-CSCF bears the main responsibility and the Interrogating type is optional. The control layer S-CSCF controls service triggering according to the subscription information of the user, invokes the services on the AS, and implements the service functions.

The I/S-CSCF are described collectively in the figure.

107, a Service Continuity and Consistency Application Server (SCC AS) is an application server for achieving service continuity;

108, a Remote End establishes an IMS session with a UE, and the remote end may be a UE, or a server for providing services, for example a streaming media server; it has no direction relation with the present invention and thus will not be described in detail here;

as shown in FIG. 1, MME/E-UTRAN/SGW/PDN GW are all LTE/SAE network elements, and ATCF/AGW/CSCF/SCC AS are IMS network elements.

When the UE is in the LTE/SAE network coverage area, it firstly performs EPS attachment, and establishes a channel of the UE—an Evolved Universal Terrestrial Radio Access Network (E-UTRAN)—SGW/PDN GW, on which all subsequent IMS signaling and medias are borne and interacted with the IMS network elements.

FIG. 2 is an existing flowchart of session anchoring when a UE performs attachment through LTE/SAE, and then performs IMS registration, and establishes a voice session, which will be described as follows:

Step 201, the UE initiates an EPS attachment request to the MME at the current residing network LTE/SAE;

in this attachment request, the UE informs the MME of whether the UE has SRVCC capability.

Step 202, the MME initiates a location update request to the HSS.

Step 203, the HSS returns a location update response to the MME, where the response carries the LTE/SAE subscription data of related users.

Step 204, the MME returns an attachment acceptance request to the UE.

By now, the attaching process of the UE in the LTE/SAE is over, and the channel of UE—E-UTRAN—SGW/PDN GW is completely established.

Step 205, the UE initiates an IMS registration request in the current residing network, and the registration request message reaches the ATCF.

Step 206, the ATCF distributes a Visited Session Transfer Number-Single Radio (vSTN-SR) for the user.

If the user is a SRVCC user, the vSTN-SR is used for subsequent SRVCC process that possibly happens to the user.

Step 207, the ATCF sends the registration request message to the visited S-CSCF of the user, and the vSTN-SR distributed in step 206 is carried.

The registration request message in this step needs to firstly reach the home I-CSCF of the user, and an S-CSCF for serving the user is determined through interaction between the I-CSCF and HSS, and then the I-CSCF routes the registration request message to the S-CSCF for processing. In order to simplify the illustration and description, here the I-CSCF and S-CSCF are collectively descried, and the related flow of the HSS is omitted.

Step 208, the S-CSCF initiates a server registration request to the HSS, where the vSTN-SR is carried.

Step 209, the HSS returns a server registration response to the S-CSCF, where related user data are carried.

Steps 210-211, after completely processing the registration request, the S-CSCF returns a registration response message to the UE through the original path.

Step 212, after completely processing the registration response message of the user, the S-CSCF performing the third-party registration to the corresponding application server (AS) in place of the UE if needed according to the initial Filter Criteria (iFC).

If the user is a SRVCC user, the S-CSCF needs to perform the third-party registration to the SCC AS in place of the UE, where the vSTN-SR in step 207 is carried.

Steps 212a-212b, the vSTN-SR is loaded to the LTE/SAE network element (MME) through an HSS promotion process.

During the subsequent process of triggering SRVCC, the vSTN-SR is transmitted to the CS network element by the LTE/SAE network element; or the vSTN-SR is transmitted to the corresponding LTE/SAE and CS network element through other paths so as to achieve SRVCC.

Step 213, the UE initiates an IMS session, and the session request reaches the ATCF, where the Session Description Protocol (SDP) information of the UE, such as, IP address, media stream coding format and port number, etc. is carried.

Step 214, the ATCF decides whether to anchor the media portion of the voice call initiated by the user, or interacts with the network element of the home IMS domain of the user, such as S-CSCF and SCC AS, etc., to decide whether to anchor the media portion of the voice call initiated by the user.

If the ATCF decides to anchor the media portion of the session, the ATCF will distribute an AGW for the session and anchor the media on the AGW.

Step 215, according to the decision result in step 214, the ATCF anchors or anchors the session, and establishes a voice connection with the home domain IMS of the user, and the remote UE.

Step 216, the ATCF returns a session establishment response to the UE.

According to whether to anchor the call or not, the SDP information of the remote UE or the AGW is carried in step 216.

In a practical application process, the session anchored on the ATCF, and the media of the same session anchored on the AGW are not used in many cases, which cause resource waste of the network side.

SUMMARY OF THE INVENTION

The technical problem to be solved in the present invention is to provide a method and system for obtaining user equipment ability by user equipment, a home subscriber data server (HSS) and a core network element.

In order to solve the technical problem of reducing waste of network resources, the present invention provides a method for obtaining user equipment ability by a core network element, comprising the following steps of:

a home subscriber data server (HSS) informing an IP multimedia network subsystem (IMS) network element of ability information of user equipment (UE) in and/or after an IP multimedia network subsystem (IMS) registration process.

In the method of the present invention, the step of the HSS informing the IMS network element of the ability information of the UE in the IMS registration process comprises:

in the IMS registration process, the HSS sending the ability information of the UE to a serving-Call Session Control Function (S-CSCF) through a sever registration response, and the S-CSCF sending the ability information of the UE to an Access Transfer Control Function (ATCF).

In the method of the present invention, the step of the HSS sending the ability information of the UE to the S-CSCF through a sever registration response comprises:

after receiving a server registration request sent by the S-CSCF, the HSS placing the ability information of the UE in a server registration response message and sending the server registration response message to the S-CSCF; or, after receiving a server registration request sent by the S-CSCF, if judging that a user has SRVCC subscription, the HSS placing the ability information of the UE in a server registration response message and sending the server registration response message to the S-CSCF.

In the method of the present invention, the step of the S-CSCF sending the ability information of the UE to the ATCF comprises:

after receiving the server registration response message carrying the ability information of the UE sent by the HSS, the S-CSCF sending a registration response message to the ATCF, and carrying the ability information of the UE in the registration response message; or, the S-CSCF sending the ability information of the UE to the ATCF through an informing message.

In the method of the present invention, the step of the S-CSCF sending the ability information of the UE to the ATCF through a notification message comprises:

the ATCF initiating subscription for UE ability to the S-CSCF, and the S-CSCF carrying the ability information of the UE in a subscription notification message to be sent to the ATCF.

In the method of the present invention, the step of the HSS informing the IMS network element of the ability information of the UE in the IMS registration process and after the IMS registration process comprises:

in the IMS registration process, the HSS sending the ability information of the UE to the S-CSCF through a server registration response; after obtaining the ability information of the UE, the S-CSCF sending the ability information of the UE to a Service Continuity and Consistency Application Server (SCC AS) after the IMS registration process is over.

In the method of the present invention, the step of the S-CSCF sending the ability information of the UE to the SCC AS comprises: the S-CSCF sending the ability information of the UE to the SCC AS through a third-party registration process.

In the method of the present invention, the step of the HSS informing the IMS network element of the ability information of the UE after the IMS registration process comprises:

after the IMS registration process is over, the HSS sending the ability information of the UE to the SCC AS through an update response message of the SCC AS, or, after the IMS registration process is over, the HSS sending the ability information of the UE to the SCC AS through a notification message.

In the method of the present invention, the step of the HSS sending the ability information of the UE to the SCC AS through a notification message comprises:

the SCC AS initiating subscription for UE ability to the HSS, and the HSS carrying the ability information of the UE in a subscription notification message to be sent to the SCC AS.

In the method of the present invention, the ability information of the UE comprises Single Radio Voice Call Continuity (SRVCC) ability of the UE.

In order to solve the technical problem of reducing waste of network resources, the present invention provides a method for obtaining user equipment ability by a core network element, comprising the following steps of:

in a Long Term Evolution/System Architecture Evolution (LTE/SAE) attachment process, user equipment (UE) reporting ability information of itself to a mobility management entity (MME), and a home subscriber data server (HSS) obtaining the ability information of the UE from the MME.

In the method of the present invention, the step of the HSS obtaining the ability information of the UE from the MME comprises:

after receiving an attachment request carrying the ability information of the UE sent by the UE, the MME carrying the ability information of the UE in a location update request to be sent to the HSS; or, after returning an attachment response to the MME, the HSS sending a query message to the MME, and the MME carrying the ability information of the UE in a query response retuned to the HSS.

In the method of the present invention, the HSS informs an IMS network element of the ability information of the UE in and/or after an IP multimedia network subsystem (IMS) registration process.

In the method of the present invention, the IMS network element comprises an Access Transfer Control Function (ATCF) and/or a Service Continuity and Consistency Application Server (SCC AS).

In the method of the present invention, the ability information of the UE comprises Single Radio Voice Call Continuity (SRVCC) ability of the UE.

In order to solve the technical problem of reducing waste of network resources, the present invention further provides a home subscriber data server (HSS), comprising a deciding module and an information notifying module, wherein, the deciding module is configured to decide to trigger the information notifying module in an IP multimedia network subsystem (IMS) registration process or after the IMS registration process;

the information notifying module is configured to inform an IMS network element of ability information of user equipment (UE).

In order to solve the technical problem of reducing waste of network resources, the present invention further provides a system for obtaining user equipment ability by a core network element, comprising: a home subscriber data server (HSS) and user equipment (UE), wherein:

the UE is configured to report ability information of itself to a MME in a Long Term Evolution/System Architecture Evolution (LTE/SAE) attachment process;

the HSS is configured to obtain the ability information of the UE from the MME.

In order to solve the technical problem of reducing waste of network resources, the present invention further provides user equipment, comprising a deciding module and an ability reporting module, wherein:

the deciding module is used to decide to trigger the ability reporting module in a Long Term Evolution/System Architecture Evolution (LTE/SAE) attachment process;

the ability reporting module is configured to report ability information of itself to a mobility management entity (MME).

In order to solve the technical problem of reducing waste of network resources, the present invention provides a system for obtaining user equipment ability by a core network element, comprising: user equipment (UE), a home subscriber data server (HSS) and an IP multimedia network subsystem (IMS) network element, wherein:

the user equipment is configured to report ability information of itself to a mobility management entity (MME) in a Long Term Evolution/System Architecture Evolution (LTE/SAE) attachment process;

the HSS is configured to obtain the ability information of the UE from the MME, and inform the IMS network element of the ability information of the UE in and/or after an IMS registration process.

In the system of the preset invention, the IMS network element comprises an Access Transfer Control Function (ATCF) and/or a Service Continuity and Consistency Application Server (SCC AS).

In the system of the preset invention, the IMS network element further comprises a serving-Call Session Control Function (S-CSCF):

the HSS is configured to send the ability information of the UE to the S-CSCF through a sever registration response in the IMS registration process;

the S-CSCF is configured to send the ability information of the UE to the ATCF.

In the system of the preset invention, the HSS is further configured to place the ability information of the UE in a server registration response message and send the server registration response message to the S-CSCF; or, the HSS is further configured to, when judging that a user has SRVCC subscription, place the ability information of the UE in a server registration response message and send the server registration response message to the S-CSCF.

In the system of the preset invention, the S-CSCF is further configured to send the ability information of the UE to the ATCF through a registration response message; or, the ATCF is configured to initiate subscription for UE ability to the S-CSCF;

the S-CSCF is configured to carry the ability information of the UE in a subscription notification message to be sent to the ATCF after receiving the subscription of the ATCF.

In the system of the present invention, the HSS is further configured to send the ability information of the UE to the S-CSCF through a server registration response in the IMS registration process;

the S-CSCF is configured to, after obtaining the ability information of the UE, send the ability information of the UE to the SCC AS through a third-party registration process after the IMS registration process is over.

In the system of the present invention, the HSS is further configured to send the ability information of the UE to the SCC AS through an update response message of the SCC AS after the IMS registration process is over; or, the SCC AS is configured to initiate subscription for UE ability to the HSS;

the HSS is further configured to carry the ability information of the UE in a subscription notification message to be sent to the SCC AS after receiving the subscription of the SCC AS.

In the system of the present invention, the ability information of the UE comprises Single Radio Voice Call Continuity (SRVCC) ability of the UE.

By using the method and system of the present invention, the HSS is enabled to obtain the ability information of the user equipment, and can provide services for multiple services of the user; the IMS network element is enabled to obtain the SRVCC ability information of the user equipment and can ensure that the IMS network element can correctly decide whether the user equipment needs to anchor the session or media, which, on one hand, provides good experience for the user, and on the other hand, reduces waste of network resources.

PREFERRED EMBODIMENTS OF THE INVENTION

Figure 1:
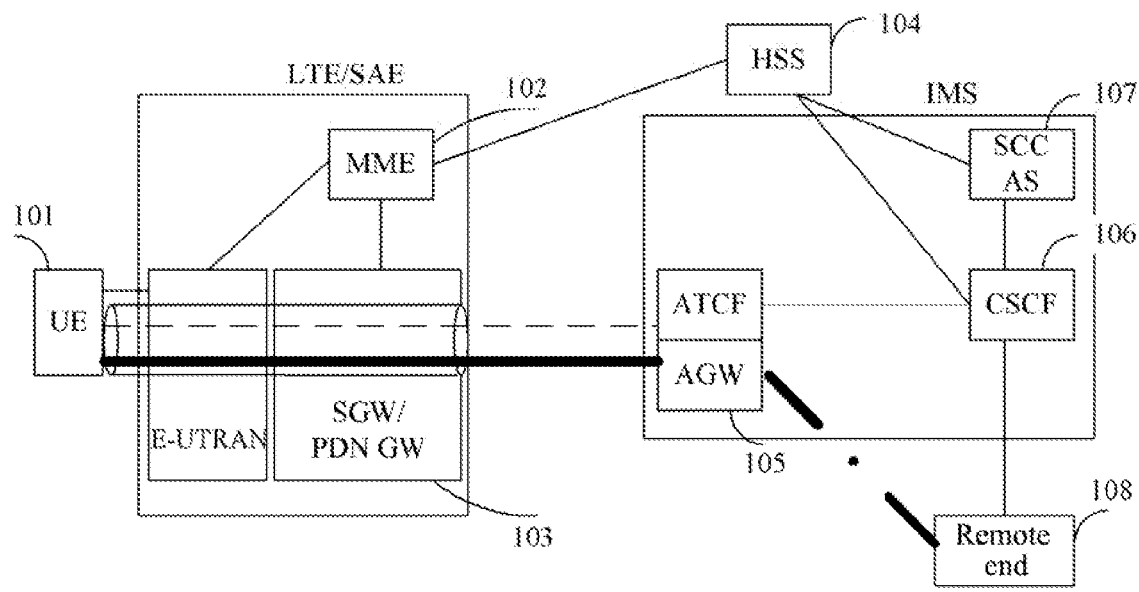
FIG. 1 illustrates the architecture of a UE attaching to the network and establishing an IMS call in a LTE/SAE.
Figure 2:
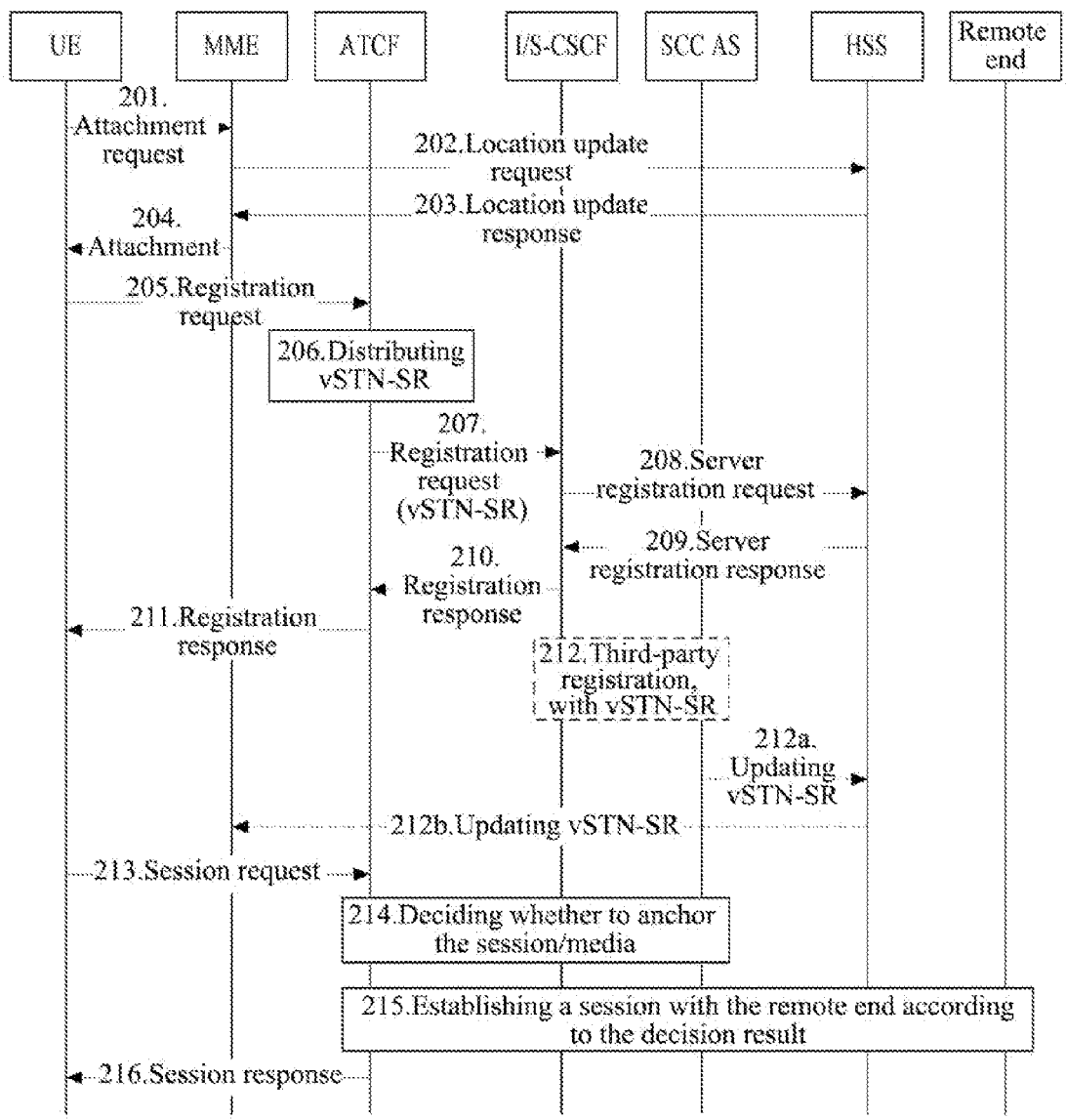
FIG. 2 illustrates a signaling flow of performing LTE/SAE network attachment, and subsequently performing IMS registration, and call anchoring in the prior art.

In order to make the purpose, the technical scheme and advantages of the present invention clearer, the examples of the present invention will be described in detail below with reference to the drawings. It should be pointed out that the examples and the features therein of the present application can be combined with each other in any way without conflict.

The inventor of the present application found after research that since the IMS network element generally performs anchoring for the user equipment in step 214 of the prior flow, there will be cases where the session or media of the user equipment that does not need to be anchored is also anchored, thus causing waste of network side resources. Meanwhile, the inventor of the present application found that the reason is that the IMS network element does not know the SRVCC ability information of the UE, and thus performs anchoring measure for all user equipment in order to avoid influence on the performance and user experience when the UE subsequently has SRVCC switching due to non-anchoring of the UE supporting SRVCC. However, if the UE does not have SRVCC ability, it is impossible for the UE to initiate a SRVCC switching flow after the session is completely established, at which moment there will be a case where the anchored session and media cannot be used, thus wasting the resources of the network side. Therefore, it is considered in the examples of the present invention that before or when the session is established, the IMS network element (for example, the ATCF and/or SCC AS) is informed of the SRVCC ability information of the UE so that the IMS network element can correctly decide whether to anchor the session of the UE.

In the examples of the present invention, in and/or after an IMS registration process, a HSS informs an IMS network element of the ability information of the UE.

The ability information of the UE comprises the SRVCC ability information of the UE, and other ability information related with the UE, for example, IMS Centralized Services (ICS) ability information, and the like.

As one of the reference information, the UE ability is provided for the IMS network element to decide whether to anchor the session so as to avoid waste of network resources and avoid bad user experience caused by long voice interruption of the UE in switching.

The HSS can obtain the ability information of the UE in the following ways: in a LTE/SAE attachment process, the UE reports the ability information of itself to the HSS through the MME; or, the UE carries the ability information of itself in an attachment request to be sent to the MME; after receiving the attachment request and returning an attachment response to the MME, the HSS sends a query message to the MME, and the MME carries the ability information of the UE in a query response retuned to the HSS.

The HSS can serve various services of the UE related with the UE ability after obtaining UE ability information. By taking Single Radio or Dual Radio ability of the UE as an example, the Single Radio UE means that the UE can only reside in one access network, for example, UTRAN or E-UTRAN, at one moment; Dual Radio UE means that the UE can reside in multiple access networks (generally two) at one moment, for example, Wireless Local Area Network (WLAN) and UTRAN, etc. According to the ability information of the UE, the HSS can judge whether the UE is a Single Radio or Dual Radio terminal, thus determining whether the network where the UE is currently located can be correctly judged, so as to ensure correct Termination Access Domain Selection for the UE.

Besides, there may be various applications in other aspects. In conclusion, the HSS obtaining UE ability information can serve various services of the UE.

Specifically, the HSS can inform the IMS network element of the UE ability information in any of the following three ways:

in the IMS registration process, the HSS sends the ability information of the UE to the S-CSCF through a sever registration response, and the S-CSCF sends the ability information of the UE to the ATCF.

Wherein, the step of the HSS sending the ability information of the UE to the S-CSCF through a sever registration response comprises: after receiving a server registration request sent by the S-CSCF, the HSS placing the ability information of the UE in a server registration response message and sending the server registration response message to the S-CSCF; or, after receiving a server registration request sent by the S-CSCF, if judging that a user has SRVCC subscription, the HSS placing the ability information of the UE in a server registration response message and sending the server registration response message to the S-CSCF.

Wherein, the step of the S-CSCF sending the ability information of the UE to the ATCF may comprise:

after receiving the server registration response message carrying the ability information of the UE sent by the HSS, the S-CSCF sending a registration response message to the ATCF, and carrying the ability information of the UE in the registration response message; or, the S-CSCF sending the ability information of the UE to the ATCF through an informing message (the ATCF initiates subscription for UE ability to the S-CSCF, and the S-CSCF carries the ability information of the UE in a subscription notification message to be sent to the ATCF).

In the IMS registration process, the HSS sends the ability information of the UE to the S-CSCF through a server registration response; after obtaining the ability information of the UE, the S-CSCF sends the ability information of the UE to a SCC AS after the IMS registration process is over.

Wherein, the step of the S-CSCF sending the ability information of the UE to the SCC AS may comprise: the S-CSCF sending the ability information of the UE to the SCC AS through a third-party registration process.

After the IMS registration process is over, the HSS sends the ability information of the UE to the SCC AS through an update response message of the SCC AS, or, through a notification message (the SCC AS initiates subscription for UE ability to the HSS, and the HSS carries the ability information of the UE in a subscription notification message to be sent to the SCC AS).

In the example, the HSS for implementing the above method comprises: a deciding module and an information notifying module, wherein, the deciding module is configured to decide to trigger the information notifying module after an IMS registration process or after the IMS registration process;

the information notifying module is configured to inform an IMS network element of ability information of UE.

In this example, the system for obtaining user equipment ability by the HSS comprises: a home subscriber data server (HSS) and user equipment (UE), wherein:

the UE is configured to report ability information of itself to a MME in a Long Term Evolution/System Architecture Evolution (LTE/SAE) attachment process;

the HSS is configured to obtain the ability information of the UE from the MME.

In this example, the user equipment for implementing reporting ability information comprises a deciding module and an ability reporting module, wherein:

the deciding module is used to decide to trigger the ability reporting module in a Long Term Evolution/System Architecture Evolution (LTE/SAE) attachment process;

the ability reporting module is configured to report ability information of itself to a mobility management entity (MME).

In this example, the system for obtaining user equipment ability by an IMS network element comprises: user equipment (UE), a home subscriber data server (HSS) and an IP multimedia network subsystem (IMS) network element, wherein:

the user equipment is configured to report ability information of itself to a MME in a LTE/SAE attachment process;

the HSS is configured to obtain the ability information of the UE from the MME, and inform the IMS network element of the ability information of the UE in and/or after an IMS registration process.

The IMS network element comprises an ATCF and/or an SCC AS.

Preferably, the IMS network element further comprises an S-CSCF. The HSS is configured to send the ability information of the UE to the S-CSCF through a sever registration response; the S-CSCF is configured to send the ability information of the UE to the ATCF.

Preferably, the HSS is further configured to place the ability information of the UE in a server registration response message and send the server registration response message to the S-CSCF; or, the HSS is further configured to, when judging that a user has SRVCC subscription, place the ability information of the UE in a server registration response message and send the server registration response message to the S-CSCF.

Preferably, the S-CSCF is further configured to send the ability information of the UE to the ATCF through a registration response message; or, the ATCF is configured to initiate subscription for UE ability to the S-CSCF; the S-CSCF is configured to carry the ability information of the UE in a subscription notification message to be sent to the ATCF after receiving the subscription of the ATCF.

Preferably, the HSS is further configured to send the ability information of the UE to the S-CSCF through a server registration response in the IMS registration process; the S-CSCF is configured to, after obtaining the ability information of the UE, send the ability information of the UE to the SCC AS through a third-party registration process after the IMS registration process is over.

Preferably, the HSS is further configured to send the ability information of the UE to the SCC AS through an update response message of the SCC AS after the IMS registration process is over; or, the SCC AS is configured to initiate subscription for UE ability to the HSS; the HSS is further configured to carry the ability information of the UE in a subscription notification message to be sent to the SCC AS after receiving the subscription of the SCC AS.

The above method for implementing selectively anchoring a session will be described below in detail with reference to the drawings and specific examples. Description will be made in the following examples by taking an IMS network element obtaining the SRVCC information of the UE as an example. The method for sending other ability information is similar to this, and will not be repeated here.

EXAMPLE ONE

Figure 3:
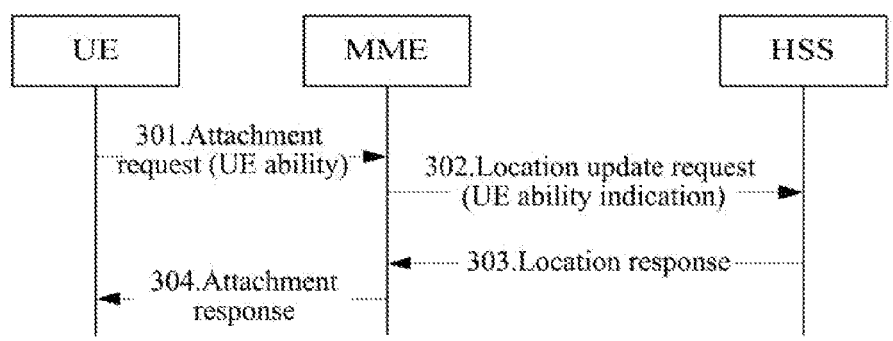
FIG. 3 illustrates a flow of implementation of reporting the UE ability to the HSS according to Example one of the present invention.

In this example, in a LTE/SAE attachment process, the UE reports its SRVCC ability information to the HSS through the MME. FIG. 3 is a flowchart of implementation of reporting the UE ability to the HSS in Example one of the present invention. This example comprises the following steps:

in step 301, the UE initiates an EPS attachment request to the MME in the current residing network LTE/SAE;

the UE carries its SRVCC ability information in this attachment request to inform the MME of whether it has SRVCC ability;

in step 302, the MME initiates a location update request to the HSS;

the MME carries the SRVCC ability information of the UE in the message of step 302;

in step 303, the HSS returns a location update response carrying the LTE/SAE subscription data of the related user to the MME;

in step 304, the MME returns an attachment acceptance request to the UE.

The HSS may also obtain the ability information of the UE in other ways. If the LTE/SAE attachment message initiated by the MME does not carry the ability information of the UE, the HSS, after the attachment process, may voluntarily query the ability information of the UE to the MME, and the MME returns a query response carrying the ability information of the UE to the HSS after receiving the query request of the HSS.

After obtaining the ability information of the UE, the HSS can provide services for various services of the user. In addition, the HSS may also send the ability information of the UE to the IMS network element so as to avoid waste of network resources and avoid bad user experience caused by long voice interruption of the UE in switching. The HSS can send the SRVCC ability information of the UE to the IMS network element in the method of any example among the following examples two, three and four.

EXAMPLE TWO

Figure 4:
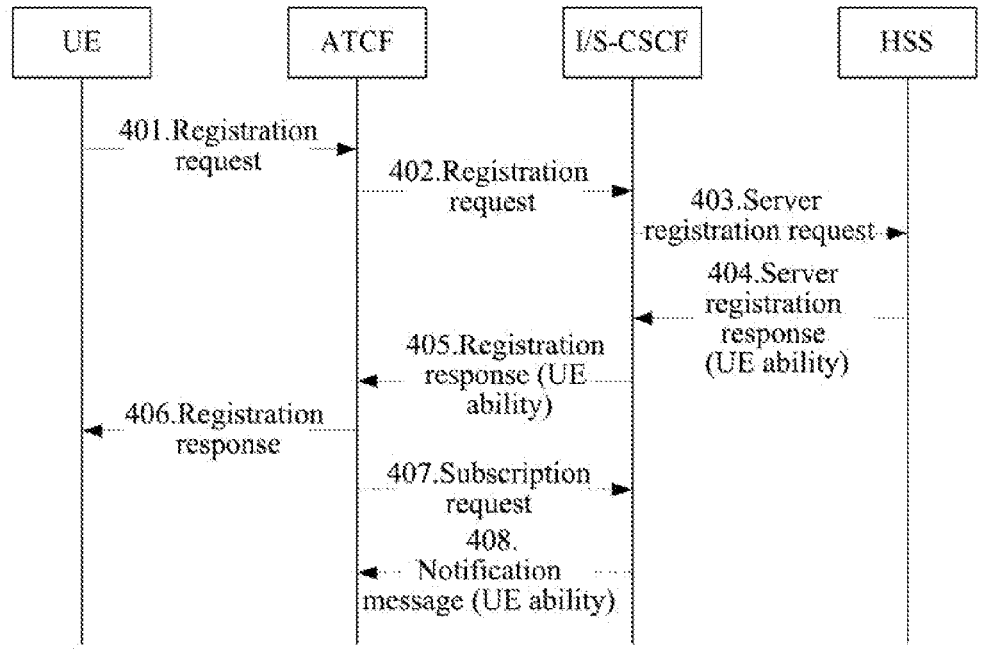
FIG. 4 illustrates a signaling flow of implementation of the HSS transmitting the UE ability to the ATCF according to Example two of the present invention.

In this example, in the IMS registration process implemented by the user through the UE, the HSS sends the SRVCC ability information of the UE currently being used by the user to the S-CSCF through a sever registration response, and the S-CSCF sends the SRVCC ability information of the UE to the ATCF (may through a server registration response, or a special notification message). FIG. 4 illustrates a signaling flow of implementation of the ATCF obtaining the SRVCC ability of the UE according to Example two of the present invention. This example comprises the following steps:

in step 401, the UE initiates an IMS registration request in the LTE/SAE, and the registration request message reaches the ATCF;

in step 402, the ATCF sends the registration request message to the visited S-CSCF of the UE;

in step 403, the S-CSCF initiates a server registration request to the HSS to initiate a registration process to the HSS;

in step 404, the HSS returns a server registration response carrying the ability information of the UE to the S-CSCF;

the UE ability information in step 404 is whether the UE has SRVCC ability; the HSS can store the ability information in the SRVCC subscription data of the user using the UE, and send it to the S-CSCF through a server registration response message; or, the HSS only stores the SRVCC ability information of the UE in the subscription data and issue it to the S-CSCF when judging according to the subscription data that the user has SRVCC subscription. Or, the ability information is directly stored in the server registration response message and sent to the S-CSCF.

in step 405, the S-CSCF returns a registration response message (success or failure) carrying the SRVCC ability information of the UE to the ATCF;

in step 406, the ATCF returns the registration response message to the UE;

the ATCF may also obtain the SRVCC ability information of the UE in another way, i.e., after receiving registration success message (at which moment the registration success message does not include the SRVCC ability information of the UE) in step 405:

in step 407, the ATCF initiates a subscription message to the S-CSCF, and subscribes to the SRVCC ability information of the UE;

in step 408, the S-CSCF sends a notification message carrying the SRVCC ability information of the UE to the ATCF.

EXAMPLE THREE

Figure 5:
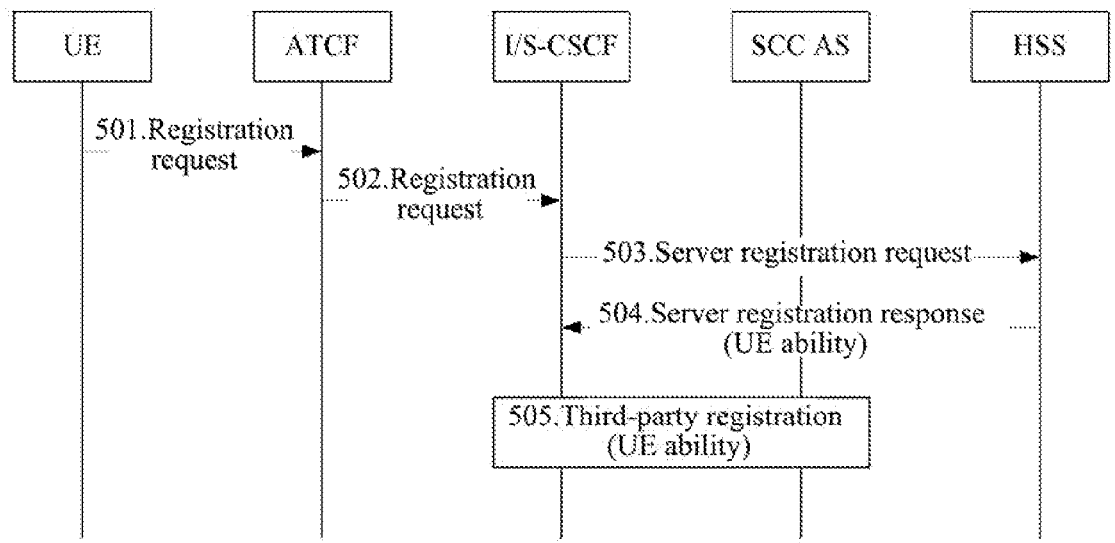
FIG. 5 illustrates a signaling flow of implementation of the HSS transmitting the UE ability to the SCC AS according to Example three of the present invention.

In this example, in the IMS registration process implemented by the user through the UE, the HSS sends the SRVCC ability information of the UE currently being used by the user to the S-CSCF through a sever registration response; after obtaining the ability information of the UE, the S-CSCF sends the SRVCC ability information of the UE to the SCC AS (for example, through a third-party registration process) after the IMS registration process is over. FIG. 5 illustrates a signaling flow of implementation of the SCC AS obtaining the SRVCC ability information of the UE according to Example three of the present invention. This example comprises the following steps:

in step 501, the UE initiates an IMS registration request in the LTE/SAE, and the registration request message reaches the ATCF;

in step 502, the ATCF sends the registration request message to the S-CSCF of the visited place of the UE;

in step 503, the S-CSCF initiates a server registration request to the HSS to initiate a registration process to the HSS;

in step 504, the HSS returns a server registration response carrying the ability information of the UE to the S-CSCF;

in step 505, the S-CSCF initiates a third-party registration to the SCC AS according to the initial Filter Criteria (iFC), and the registration message carries the SRVCC ability information of the UE.

EXAMPLE FOUR

Figure 6:
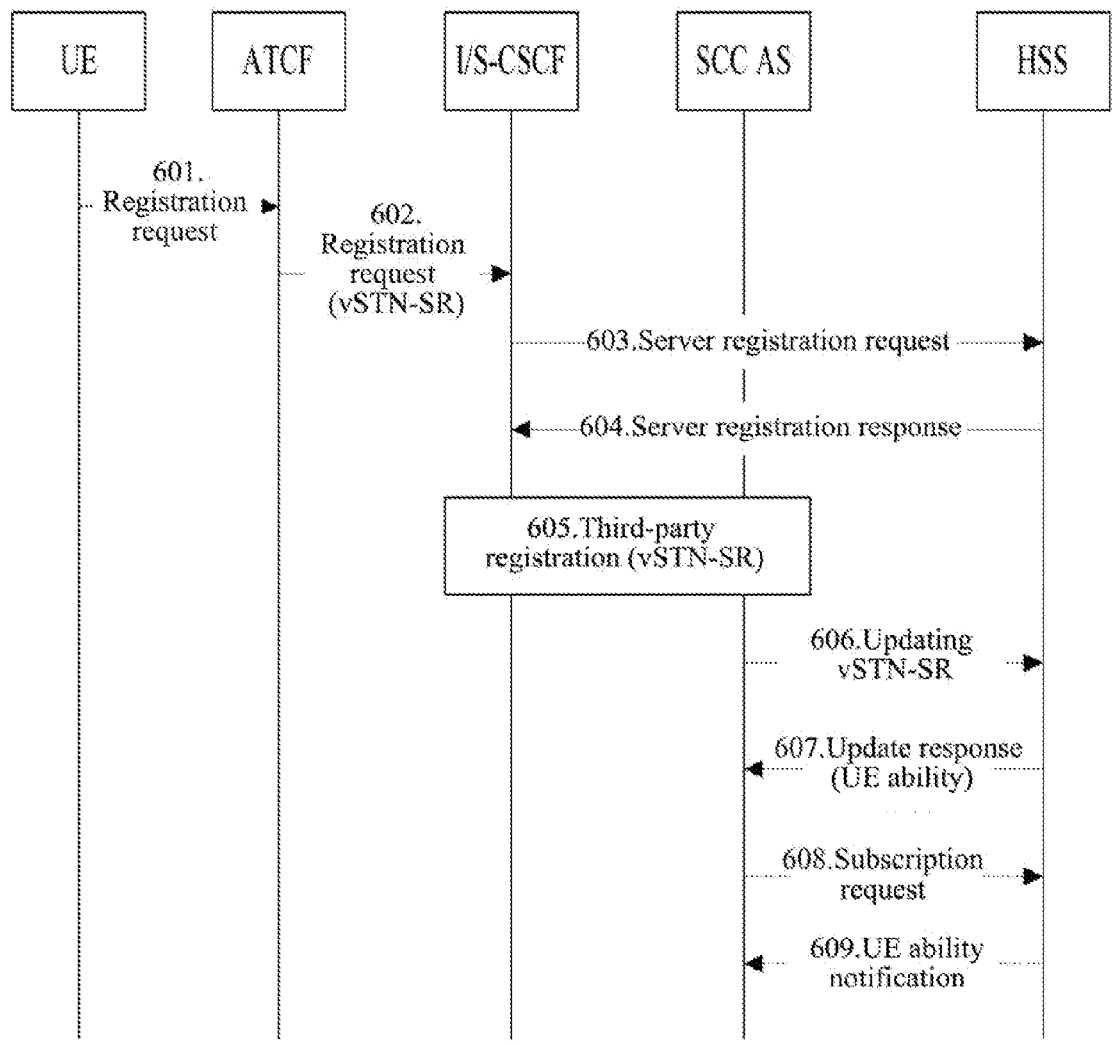
FIG. 6 illustrates a signaling flow of implementation of the HSS transmitting the UE ability to the SCC AS according to Example four of the present invention.

In this example, after the IMS registration process implemented by the user through the UE is over, the HSS sends the SRVCC ability information of the UE currently being used by the user to the SCC AS (through an update response of the SCC AS, or a special notification message). FIG. 6 illustrates a flowchart of implementation of the SCC AS obtaining the SRVCC ability information of the UE according to Example four of the present invention. This example comprises the following steps:

in step 601, the UE initiates an IMS registration request in the LTE/SAE, and the registration request message reaches the ATCF;

in step 602, the ATCF sends the registration request message to the S-CSCF of the visited place of the user;

the ATCF distributes a vSTN-SR for the user, and adds the vSTN-SR in step 602;

in step 603, the S-CSCF initiates a server registration request to the HSS to initiate a registration process to the HSS;

in step 604, the HSS returns a server registration response to the S-CSCF;

in step 605, the S-CSCF initiates a third-party registration to the SCC AS according to the initial Filter Criteria (iFC), and the registration message carries the vSTN-SR;

in step 606, the SCC AS initiates a process of updating the vSTN-SR to the HSS, and changes the STN-SR stored in HSS to the vSTN-SR carried in step 605;

in step 607, the HSS returns an update response to the SCC AS, and the update response carries the SRVCC ability information of the UE;

the SCC AS may also obtain the SRVCC ability information of the UE in another way:

in step 608, the SCC AS initiates a subscription message to the HSS to subscribe to the SRVCC ability information of the UE;

in step 609, the HSS sends a subscription notification message carrying the SRVCC ability information of the UE to the SCC AS.

A person having ordinary skill in the art can appreciate that all of part of the steps of the above method may be implemented by instructing related hardware with a program, which may be stored in a computer-readable medium, such as a read-only memory, a magnetic disk or an optical disk. Optionally, all of part of the steps of the above examples may also be implemented by using one or more integrated circuits. Correspondingly, each module/unit in the above examples may be implemented in the form of hardware, or in the form of software functional modules. The present invention is not limited to any particular form of combination of hardware and software.

Of course, the present invention may have many other examples, and a person having ordinary skill in the art can make various corresponding modifications and transformations to the present invention without departing from the spirit and essence of the present invention. However, these corresponding modifications and transformations should be within the protection scope of the claims of the present invention.

INDUSTRIAL APPLICABILITY

By the present invention, the HSS is enabled to obtain the ability information of the user equipment, and can provide services for multiple services of the user; the IMS network element is enabled to obtain the SRVCC ability information of the user equipment and can ensure that the IMS network element can correctly decide whether the user equipment needs to anchor the session or media, which, on one hand, provides good experience for the user, and on the other hand, reduces waste of network resources.

What is claimed is:

1. A method for obtaining user equipment ability by a core network element, comprising the following steps of:
   a home subscriber data server (HSS) informing an IP multimedia network subsystem (IMS) network element of ability information of user equipment (UE) in an IP multimedia network subsystem (IMS) registration process;
   wherein the core network element comprises an Access Transfer Control Function (ATCF) in a serving network, the ability information comprises Single Radio Voice Call Continuity (SRVCC) ability information, the IMS network element sends the ability information of the UE to the ATCF in the IMS registration process, and the ATCF anchors a session of the UE when determining the UE has the SRVCC ability, the ATCF does not anchor a session of the UE when determining the UE does not have the SRVCC ability.

2. The method according to claim 1, wherein,
   the step of the HSS informing the IMS network element of the ability information of the UE in the IMS registration process comprises:
   in the IMS registration process, the HSS sending the ability information of the UE to a serving-Call Session Control Function (S-CSCF) through a sever registration response.

3. The method according to claim 2, wherein,
   the step of the HSS sending the ability information of the UE to the S-CSCF through a sever registration response comprises:
   after receiving a server registration request sent by the S-CSCF, the HSS placing the ability information of the UE in a server registration response message and sending the server registration response message to the S-CSCF; or,
   after receiving the server registration request sent by the S-CSCF, if judging that a user has SRVCC subscription, the HSS placing the ability information of the UE in the server registration response message and sending the server registration response message to the S-CSCF.

4. The method according to claim 3, wherein,
   the S-CSCF sends the ability information of the UE to the ATCF, comprising:
   after receiving the server registration response message carrying the ability information of the UE sent by the HSS, the S-CSCF sending a registration response message to the ATCF, and carrying the ability information of the UE in the registration response message; or, the S-CSCF sending the ability information of the UE to the ATCF through an informing message.

5. The method according to claim 4, wherein,
the step of the S-CSCF sending the ability information of the UE to the ATCF through a notification message comprises:
the ATCF initiating subscription for UE ability to the S-CSCF, and the S-CSCF carrying the ability information of the UE in a subscription notification message which is sent to the ATCF.

6. A method for obtaining user equipment ability by a core network element, comprising the following steps of:
in a Long Term Evolution/System Architecture Evolution (LTE/SAE) attachment process, user equipment (UE) reporting ability information of itself to a mobility management entity (MME), and a home subscriber data server (HSS) obtaining the ability information of the UE from the MME;
the HSS informing an IMS network element of the ability information of the UE in an IP multimedia network subsystem (IMS) registration process;
wherein the core network element comprises an Access Transfer Control Function (ATCF) in a serving network, the ability information comprises Single Radio Voice Call Continuity (SRVCC) ability information, the IMS network element sends the ability information of the UE to the ATCF in the IMS registration process, and the ATCF anchors a session of the UE when determining the UE has the SRVCC ability, the ATCF does not anchor a session of the UE when determining the UE does not have the SRVCC ability.

7. The method according to claim 6, wherein,
the step of the HSS obtaining the ability information of the UE from the MME comprises:
after receiving an attachment request carrying the ability information of the UE sent by the UE, the MME carrying the ability information of the UE in a location update request to be sent to the HSS; or, after returning an attachment response to the MME, the HSS sending a query message to the MME, and the MME carrying the ability information of the UE in a query response returned to the HSS.

8. The method according to claim 6, wherein,
the IMS network element further comprises a Service Continuity and Consistency Application Server (SCC AS).

9. A home subscriber data server (HSS), comprising a deciding module and an information notifying module, wherein,
the deciding module is configured to decide to trigger the information notifying module in an IP multimedia network subsystem (IMS) registration process;
the information notifying module is configured to inform an IMS network element of ability information of user equipment (UE);
wherein a core network element comprises an Access Transfer Control Function (ATCF) in a serving network, the ability information comprises Single Radio Voice Call Continuity (SRVCC) ability information, the IMS network element sends the ability information of the UE to the ATCF in the IMS registration process, and the ATCF anchors a session of the UE when determining the UE has the SRVCC ability, the ATCF does not anchor a session of the UE when determining the UE does not have the SRVCC ability.

10. A system for obtaining user equipment ability by a core network element, comprising: a home subscriber data server (HSS), an IP multimedia network subsystem (IMS) network element, and the core network element, wherein:
the HSS is configured to obtain the ability information of the UE from a mobility management entity (MME) in a Long Term Evolution/System Architecture Evolution (LTE/SAE) attachment process, and inform the IMS network element of the ability information of the UE in an IMS registration process, wherein the ability information comprises Single Radio Voice Call Continuity (SRVCC) ability information;
the core network element comprises an Access Transfer Control Function (ATCF) in a serving network; the IMS network element is configured to send the ability information of the UE to the ATCF in the IMS registration process; and
the ATCF is configure to anchor a session of the UE when determining the UE has the SRVCC ability, and not anchor a session of the UE when determining the UE does not have the SRVCC ability.

11. The system according to claim 10, wherein,
the IMS network element further comprises a Consistency Application Server (SCC AS).

12. The system according to claim 11, wherein,
the IMS network element further comprises a serving-Call Session Control Function (S-CSCF):
the HSS is configured to send the ability information of the UE to the S-CSCF through a sever registration response in the IMS registration process;
the S-CSCF is configured to send the ability information of the UE to the ATCF.

13. The system according to claim 12, wherein,
the HSS is further configured to place the ability information of the UE in a server registration response message and send the server registration response message to the S-CSCF; or,
the HSS is further configured to, when judging that a user has SRVCC subscription, place the ability information of the UE in a server registration response message and send the server registration response message to the S-CSCF.

14. The system according to claim 13, wherein,
the S-CSCF is further configured to send the ability information of the UE to the ATCF through a registration response message; or,
the ATCF is configured to initiate subscription for UE ability to the S-CSCF;
the S-CSCF is further configured to carry the ability information of the UE in a subscription notification message to be sent to the ATCF after receiving the subscription of the ATCF.

\* \* \* \* \*